(12) United States Patent
Küther

(10) Patent No.: US 6,328,227 B1
(45) Date of Patent: Dec. 11, 2001

(54) DEVICE FOR PRODUCING A LUBRICANT MIST IN A COMPRESSED AIR LINE

(75) Inventor: Ludwig Küther, Waldenbuch (DE)

(73) Assignee: J. Lorch Gesellschaft & Co. KG, Waldenbuch (DE)

(*) Notice: Subject to any disclaimer, the term of this patent is extended or adjusted under 35 U.S.C. 154(b) by 0 days.

(21) Appl. No.: 09/509,190

(22) PCT Filed: Jul. 8, 1999

(86) PCT No.: PCT/EP99/04795
§ 371 Date: Mar. 23, 2000
§ 102(e) Date: Mar. 23, 2000

(87) PCT Pub. No.: WO00/06939
PCT Pub. Date: Feb. 10, 2000

(30) Foreign Application Priority Data

Jul. 28, 1998 (DE) .......................................... 298 13 400 U

(51) Int. Cl.$^7$ .......................................................... B05B 7/30
(52) U.S. Cl. .................... 239/369; 239/340; 184/55.2; 137/205.5; 137/512.4
(58) Field of Search .................. 239/369, 354, 239/341, 340, 338, 337, 318, 311; 184/55.2, 55.1, 6.26; 137/205.5, 512.4, 852

(56) References Cited

U.S. PATENT DOCUMENTS

| | | | |
|---|---|---|---|
| 2,105,492 | * | 1/1938 | Gartin . |
| 2,442,777 | * | 6/1948 | Norgren . |
| 3,411,609 | * | 11/1968 | German . |
| 3,605,949 | * | 9/1971 | Vock . |
| 3,703,940 | | 11/1972 | Morita . |
| 4,043,425 | * | 8/1977 | Schutzer ............................. 184/55.2 |
| 4,205,701 | * | 6/1980 | Leger ............................. 239/318 X |
| 4,295,545 | * | 10/1981 | Hiei .................................... 184/55.2 |
| 6,145,627 | * | 11/2000 | Wada ............................. 184/55.2 X |

FOREIGN PATENT DOCUMENTS

| | | |
|---|---|---|
| 1 601 474 | 10/1970 | (DE) . |
| 2 142 613 | 3/1972 | (DE) . |
| 0 237 606 | 9/1987 | (EP) . |
| 2 547 644 | 12/1984 | (FR) . |

* cited by examiner

*Primary Examiner*—Lesley D. Morris
(74) *Attorney, Agent, or Firm*—Paul Vincent

(57) ABSTRACT

Device for generating a lubricant spray in a compressed air line having an air passage channel (2) in a housing (1), a regulating valve (5), in particular a proportional valve, which can change, via a control flap (14), the free cross-section of passage between the inlet (3) and the outlet (4) of the air passage channel (2) in dependence on the pressure difference, and with a lubricant supply container (7) connected to the inlet (3) of the air passage channel (2) via a filling valve (6) comprising a valve body (15) and connected to the outlet (4) via a suction line (rising pipe 8) and an oil sprayer (12), wherein the filling valve (6) closes at a pressure difference of more than approximately 1 bar, wherein the regulating valve (5) and the filling valve (6) are disposed close to one another and the control flap (14) of the regulating valve (5) and the valve body (15) of the filling valve (6) are made from a single piece of elastic material.

9 Claims, 3 Drawing Sheets

DEVICE FOR PRODUCING A LUBRICANT MIST IN A COMPRESSED AIR LINE

BACKGROUND OF THE INVENTION

The invention concerns a device for generating a lubricant spray in a compressed air line, comprising an air passage channel of a housing, a regulating valve, in particular a proportional valve, for changing the free cross-section of passage in dependence upon the pressure difference between inlet and outlet of the air passage channel by means of a control flap, a lubricant supply container connected to the inlet of the air passage channel via a filling valve, comprising a valve body, and connected to the outlet via an oil suction line and an oil sprayer, wherein the filling valve closes at a pressure difference of more than 1 bar.

A device of this type, disclosed in DE-OS 16 01 474, comprises a flap in the air passage channel pivotable against the force of a spring. The filling valve is disposed in the housing below the air passage channel. Assembly and maintenance are difficult due to the large number of individual parts.

DE-PS 21 42 613 discloses a further device having a control flap of the regulating valve formed by a rubber-elastic tongue which bends in dependence on the pressure difference between inlet and outlet to thereby change the free cross-section of passage. A filling valve is not mentioned therein, i.e. the device has to be stopped to refill oil.

To eliminate the above-mentioned disadvantages, it is the underlying purpose of the present invention to further develop a device of the above mentioned kind which is light weight and which has a low number of easily mounted and easily assembled parts to facilitate reliable function.

To achieve this object, the invention disposes the regulating valve and the filling valve close to one another, wherein the control flap of the regulating valve and the valve body of the filling valve are produced from a single piece of elastic material, preferably rubber-elastic material.

In this manner, only a few parts which are simple and inexpensive to produce are required to thereby provide simple assembly.

Manufacturing effort is particularly reduced when the control flap and the valve body are tongues having independent function which are connected to one another via and borne by a support body. The single piece construction considerably reduces the number of parts to also facilitate automated assembly.

Costly bores in the housing are avoided by providing an opening, forming the oil sprayer, in the support body in the area above and downstream of the control flap. The fluttering movement of the control flap vibrating in the air flow produces excellent oil atomization.

Additional parts can be eliminated when the upper end of the opening forming the oil sprayer, shaped as a drip funnel, is part of the support body.

Moreover, the support body can comprise a circular edge projection which is tensioned with the housing via a head which forms, at least partially, a drip chamber. The edge projection consists of elastic, flexible material to thereby simultaneously effect sealing. In this manner, additional sealing measures and fastening means are not required.

To further reduce the number of parts, the filling valve can be fashioned from the valve body, formed as a flexible tongue, and an opening of a housing passage connecting the air passage channel with the lubricant supply container, wherein the valve body closes this opening for increased pressure differences (in excess of approximately 1 bar) between the air passage channel and the inside of the oil container.

Assembly is particularly easy when the air passage channel comprises 2 parallel walls proximate the control flap and when the control flap, formed as a tongue, bends between these walls in dependence on the pressure difference, to open the cross-section of passage to a greater or lesser extent.

Compact construction is facilitated by disposing the filling valve in the housing, relative to the direction of air flow, sidewardly next to the regulating valve and by guiding the suction line through the housing proximate the other opposite side.

Further embodiments in accordance with the invention can be extracted from the dependent claims and are explained, with their advantages, in the following description with reference to the accompanying drawing.

DESCRIPTION OF THE PREFERRED EMBODIMENT

Figure 1:
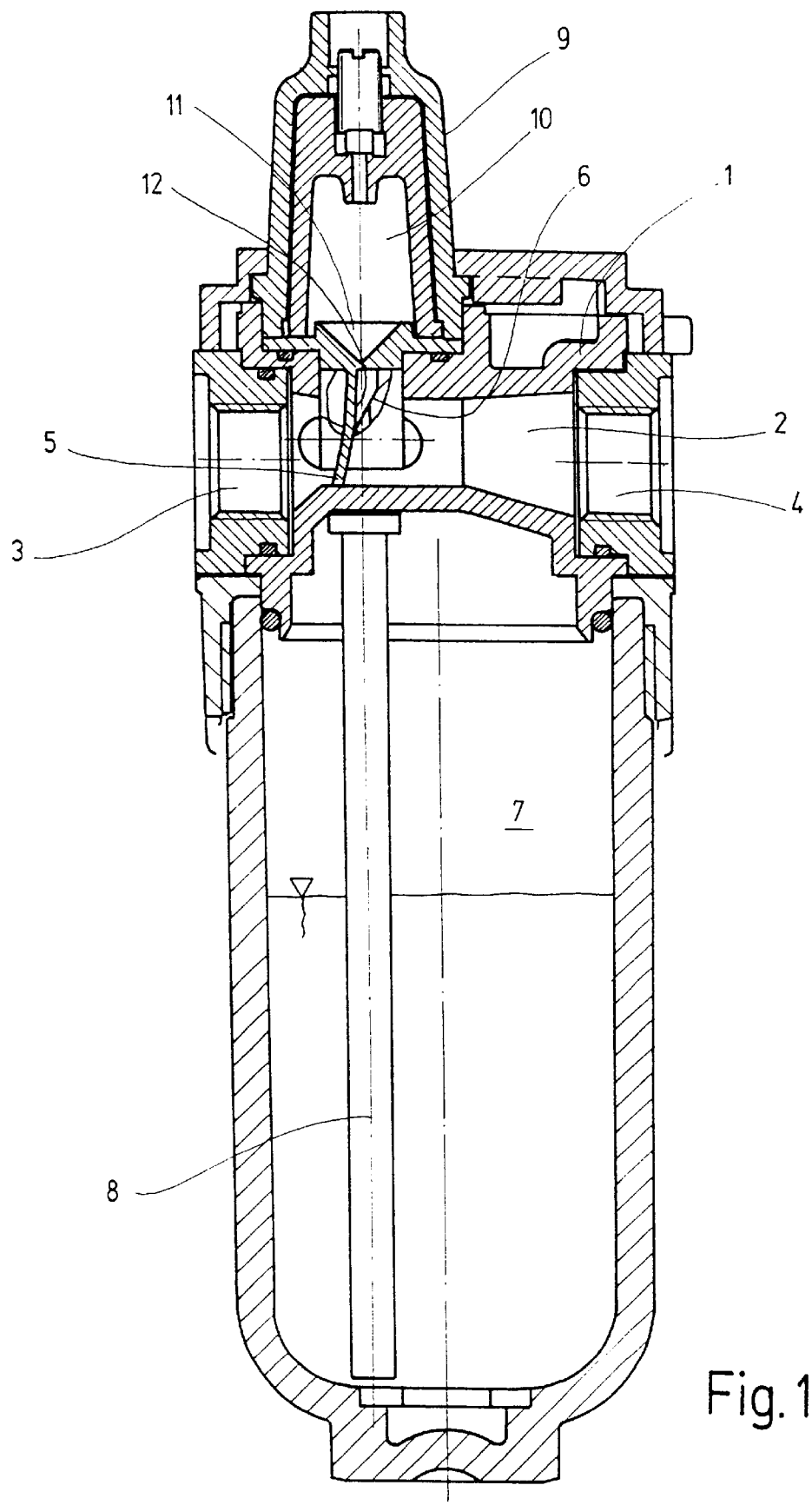
FIG. 1 shows a partial cross-section through a device for generating a lubricant spray in the plane of passage of the air flow.

The device for generating a lubricant spray in a compressed air line comprises a housing 1, preferentially made from plastic, with an air passage channel 2 formed in a Venturi manner, and with a regulating valve 5 disposed between its inlet 3 and outlet 4.

The housing 1 has a filling valve 6 disposed next to the regulating valve 5 which connects the inlet 3 to a lubricant supply container 7 disposed at the bottom of the housing 1.

The lubricant supply container 7 is connected to a drip chamber 10, surrounded by a head 9, via a rising pipe 8 (part of an oil suction line) inserted deeply into the container and passing through the housing 1. The oil is collected by a drip funnel 11 and is guided into and atomized in the air passage channel 2 via a bore functioning as an oil sprayer 12.

Figure 2:
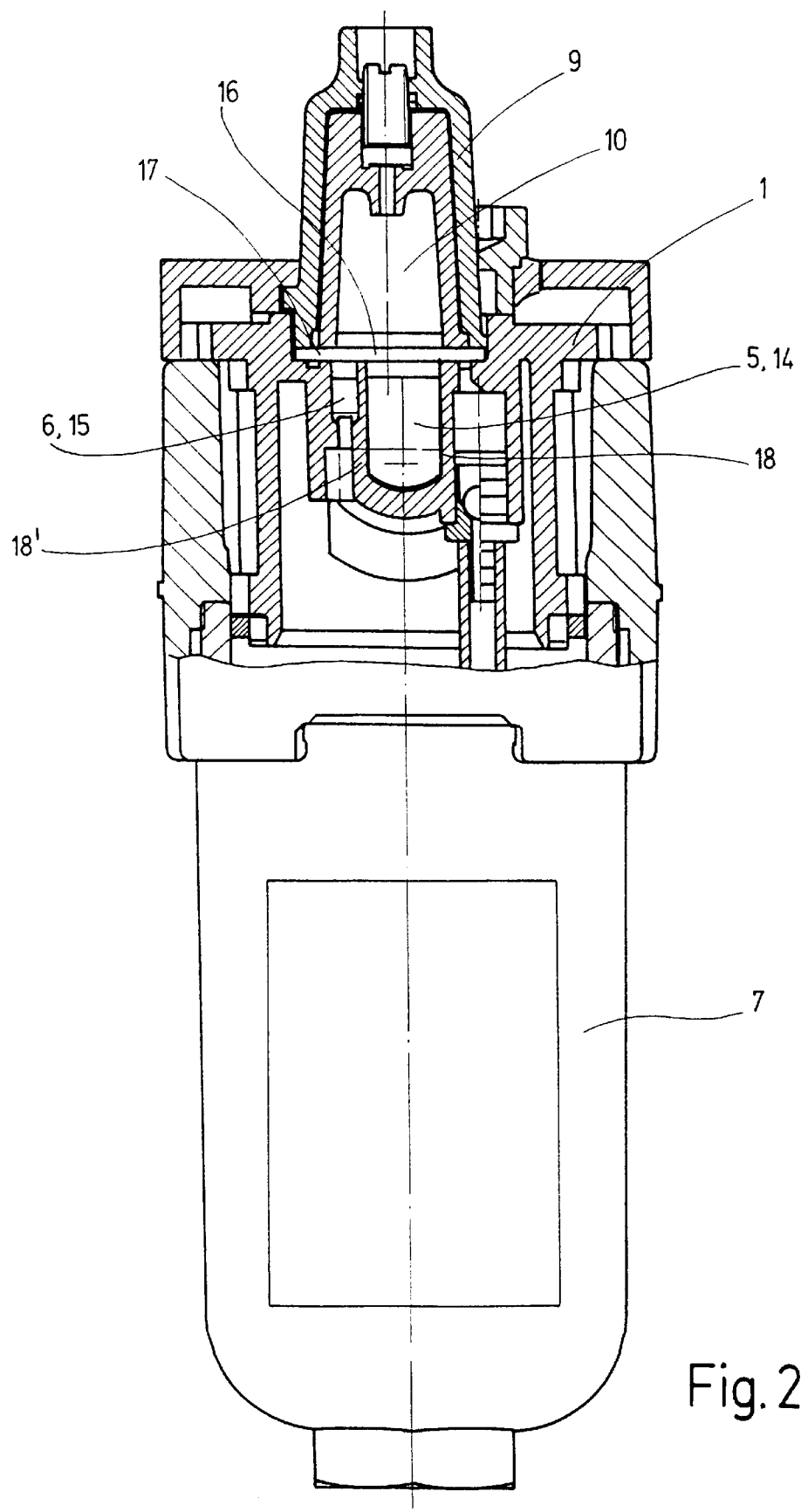
FIG. 2 shows a corresponding cross-section perpendicular to the flow direction.
Figure 3:
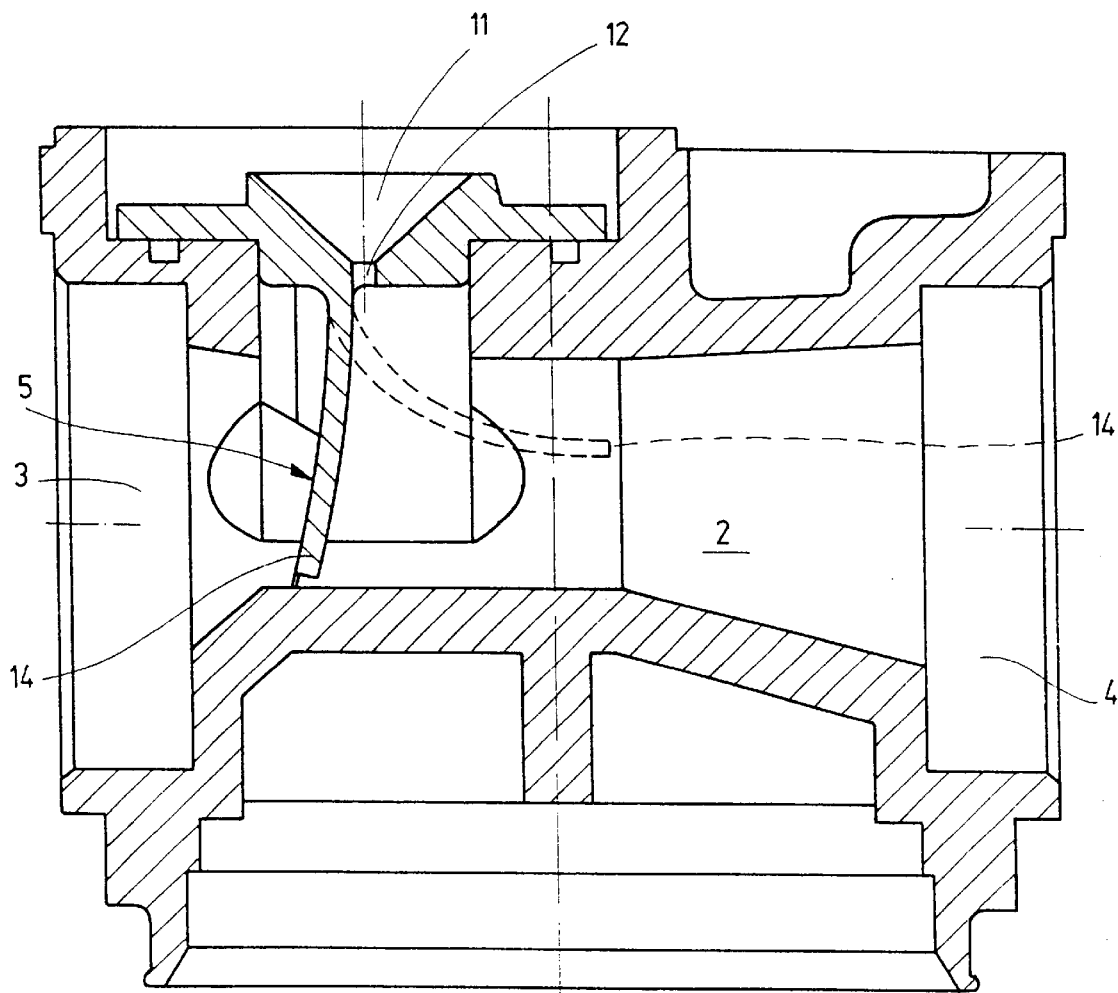
FIG. 3 shows a larger scale cross-section through the air passage channel.
Figure 4:
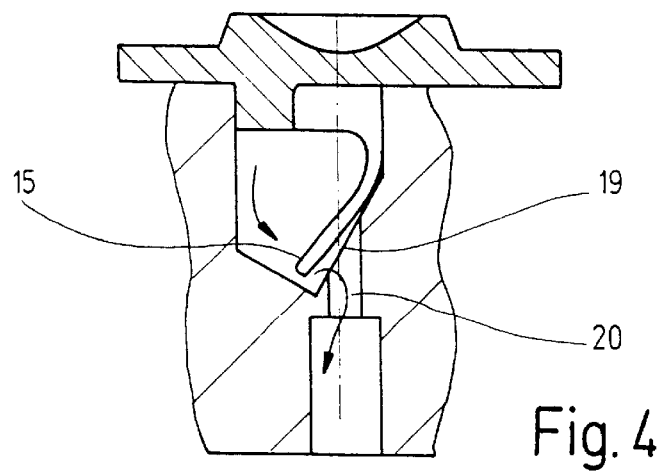
FIG. 4 shows a section through the filling valve parallel to that of FIG. 3.

As clearly seen in FIG. 2, the regulating valve 5 and the filling valve 6 are disposed next to one another. The regulating valve 5 comprises a tongue-shaped control flap 14 (FIG. 3) made from an elastic material, and the filling valve 6 has a similarly shaped valve body 15 (FIG. 4). The valve body 15 and the control flap 14 are connected to one another, as a single piece, via a support body 16, wherein the support body 16 further comprises a preferably circular edge projection 17 firmly held between the housing 1 and the head 9.

In the region of the regulating valve 5, the air passage channel 2 comprises parallel walls 18, 18' between which the tongue-shaped control flap 14 protrudes and pivots.

Air flows through the air passage channel 2 in response to a pressure difference between the inlet 3 and the outlet 4. The larger the pressure difference, the more the control flap 14 bends to change the free cross-section of passage (FIG. 3, shown in dashed lines).

The filling valve 6 is formed by an opening 19 of a housing passage 20 and the valve body 15, structured as a resilient tongue. The opening 19 is disposed at an angle relative to the axis of the housing passage 20 (see FIG. 4). During operation, the tongue-like valve body 15 extends at a small angle with respect to the opening 19. When the lubricant supply container 7 is removed in order to refill the oil supply, the pressure in the housing passage 20 drops considerably and the valve body 15 is pressed against and closes the opening 19 in response to the operating pressure, to keep the device at normal operating pressure. Flow blockage is not necessary during oil filling.

What is claimed is:

1. A device for atomizing a lubricant in a pressurized air conduit, the device comprising:

a housing having an air passage channel with an inlet, an outlet, and a passage connecting said inlet to said outlet;

a regulating valve mounted to said housing, said regulating valve having a control flap extending into said passage to change a free cross section thereof in dependence on a pressure difference between said inlet and said outlet;

a lubricant supply container mounted to said housing; a filling valve disposed proximate said regulating valve and connecting said lubricant supply container to said inlet, said filling valve having a valve body, said valve body and said control flap being made from one single piece of elastic material, said valve body closing said filling valve at a pressure difference between said inlet and said lubricant supply container in excess of approximately 1 bar;

a suction line for connecting said lubricant supply container to said outlet; and a lubricant atomizer connected between said suction line and said outlet.

2. The device of claim 1, wherein said regulating valve is a proportional valve.

3. The device of claim 1, wherein said control flap and said valve body are independently functioning tongues connected to each other and borne by a support body.

4. The device of claim 3, wherein said lubricant atomizer has an opening in said support body disposed above and downstream of said control flap.

5. The device of claim 4, wherein an upper end of said opening is shaped as a drip funnel fashioned in said support body.

6. The device of claim 3, wherein said housing comprises a head defining a drip chamber, said support body comprising a peripheral edge projection securely borne in said head.

7. The device of claim 1, wherein said valve body is a flexible tongue and said housing has a housing passage for connecting said inlet to said lubricant supply container, wherein said valve body closes an opening in said housing passage at increased pressure differences between said inlet and an inside of said lubricant supply container.

8. The device of claim 1, wherein said air passage channel comprises two parallel walls proximate said control flap, said control flap shaped as a flexible tongue, bending between said walls in dependence on a partial pressure difference to open said passage to a greater and lesser extent.

9. The device of claim 8, wherein said filling valve is disposed in said housing at a first side of said regulating valve transverse to an air flow direction in said air passage and said suction line is guided through said housing at a second side of said regulating valve opposite to said first side.

\* \* \* \* \*